(12) United States Patent
Lin

(10) Patent No.: US 8,547,963 B2
(45) Date of Patent: Oct. 1, 2013

(54) VOIP INTEGRATING SYSTEM AND METHOD THEREOF

(75) Inventor: Shu-Yi Lin, Taipei Hsien (TW)

(73) Assignee: Wistron Corp., Taipei Hsien (TW)

( * ) Notice: Subject to any disclaimer, the term of this patent is extended or adjusted under 35 U.S.C. 154(b) by 1107 days.

(21) Appl. No.: 12/367,681

(22) Filed: Feb. 9, 2009

(65) Prior Publication Data

US 2009/0238173 A1    Sep. 24, 2009

(30) Foreign Application Priority Data

Mar. 18, 2008  (TW) ............................... 97109523 A

(51) Int. Cl.
H04L 12/66    (2006.01)

(52) U.S. Cl.
USPC .......................................... 370/352; 370/419

(58) Field of Classification Search
USPC .......................................... 370/352, 419, 463
See application file for complete search history.

(56) References Cited

U.S. PATENT DOCUMENTS

| | | | | |
|---|---|---|---|---|
| 2006/0187900 A1* | 8/2006 | Akbar | ........................... | 370/352 |
| 2007/0126581 A1* | 6/2007 | Sung et al. | ................. | 340/572.1 |
| 2007/0238472 A1* | 10/2007 | Wanless | ........................ | 455/461 |
| 2007/0280452 A1* | 12/2007 | Bernard | .................... | 379/201.01 |
| 2007/0286171 A1* | 12/2007 | Guan | ............................. | 370/356 |
| 2008/0045176 A1* | 2/2008 | Ho et al. | ....................... | 455/344 |
| 2008/0104681 A1* | 5/2008 | Lai | ..................................... | 726/5 |
| 2008/0130629 A1* | 6/2008 | Yang | .............................. | 370/352 |
| 2008/0139228 A1* | 6/2008 | Raffel et al. | .................. | 455/466 |
| 2008/0144603 A1* | 6/2008 | Chouksey et al. | ............ | 370/352 |
| 2008/0144611 A1* | 6/2008 | Huang et al. | ................... | 370/352 |
| 2008/0175225 A1* | 7/2008 | Chu et al. | ....................... | 370/352 |
| 2008/0192732 A1* | 8/2008 | Riley et al. | ...................... | 370/352 |
| 2008/0192770 A1* | 8/2008 | Burrows et al. | ............... | 370/466 |
| 2008/0249778 A1* | 10/2008 | Barton et al. | .................. | 704/270 |
| 2008/0253357 A1* | 10/2008 | Liu et al. | ....................... | 370/352 |
| 2008/0310399 A1* | 12/2008 | Narayanan et al. | ........... | 370/352 |

(Continued)

FOREIGN PATENT DOCUMENTS

| | | |
|---|---|---|
| CN | 2696219 Y | 4/2005 |
| JP | 2001-127902 A | 5/2001 |

(Continued)

OTHER PUBLICATIONS

English translation of CN 2696219Y (published Apr. 27, 2005).

(Continued)

*Primary Examiner* — Brian D Nguyen
(74) *Attorney, Agent, or Firm* — McClure, Qualey & Rodack, LLP

(57) ABSTRACT

An internet phone integrating system includes a PC, a VoIP phone, a softphone, an HID signal-transmitting unit, and a media transmitting unit. The VoIP phone provides an HID inputting signal. The softphone provides an HID outputting signal and a media controlling signal and decodes an audio coding streaming to a media data flow. The HID signal-transmitting unit receives the HID outputting signal from the softphone and sends the HID outputting signal to the VoIP phone, and receives the HID inputting signal from the VoIP phone and sends the HID inputting signal to the softphone. The media transmitting unit receives the media controlling signal and media data flow from the softphone and sends the media controlling signal and media data flow to the VoIP phone, and receives the media data flow from the VoIP phone and sends the media data flow to the softphone.

18 Claims, 3 Drawing Sheets

(56) References Cited

U.S. PATENT DOCUMENTS

| | | | |
|---|---|---|---|
| 2009/0051654 A1* | 2/2009 | Wang | 345/163 |
| 2009/0067603 A1* | 3/2009 | Mohler | 379/202.01 |
| 2009/0147778 A1* | 6/2009 | Wanless et al. | 370/389 |
| 2009/0219920 A1* | 9/2009 | Brandstatter | 370/352 |
| 2009/0297585 A1* | 12/2009 | Meyers et al. | 424/431 |

FOREIGN PATENT DOCUMENTS

| | | |
|---|---|---|
| JP | 2002-158762 A | 5/2002 |
| TW | 200726146 | 7/2007 |
| TW | 200727670 | 7/2007 |
| WO | 2007095275 A2 | 8/2007 |
| WO | 2007103269 A2 | 9/2007 |

OTHER PUBLICATIONS

English translation of Chinese Office Action for the related part of CN 2696219Y mailed Oct. 9, 2010.

Taiwan Office Action dated Oct. 18, 2012.

Partial English translation of Taiwan Office Action dated Oct. 18, 2012.

Taiwan Office Action dated Apr. 23, 2013.

Partial English translation of Taiwan Office Action dated Apr. 23, 2013.

* cited by examiner

ND METHOD THEREOF

VOIP INTEGRATING SYSTEM AND METHOD THEREOF

RELATED APPLICATIONS

This application claims priority to Taiwan Application Serial Number 97109523, filed Mar. 18, 2008, which is herein incorporated by reference.

BACKGROUND

1. Field of Invention

The present invention relates to VoIP integrating system and method. More particularly, the present invention relates to VoIP integrating system and method for a VoIP phone and PC-based softphone.

2. Description of Related Art

Internet phone services available in the market now include a dedicated Internet phone (VoIP phone), a PC-based softphone, and a gateway. The dedicated Internet phone and signaling gateway are internet phone devices that can make or receive internet phone calls directly, whereas the PC-based softphone has to be installed on a PC that's turned on. Since the dedicated Internet phone provides users with the experience that's a lot like the experience of using an ordinary desktop telephone, conventional desktop telephone users prefer this option. On the other hand, the PC-based softphone provides better mobility than the dedicated Internet phone, and also provides richer and fancier multi-media user interfaces, so it attracts a certain group of users.

The dedicated Internet phone supports VoIP protocols such as SIP and H.323, while the PC-based softphone programs are Skype, MSN and YAHOO Messenger. MSN and YAHOO Messenger provide messaging services additionally. The dedicated Internet phone can only support one type of protocol at one time due to the hardware limitation. For the PC-based softphone, a user can install multiple software programs on a PC to support various types of protocols.

When it comes to process various types of VoIP protocols, a way is using a designated server to process the exchange between the various types of protocols and audio codec. For example, Microsoft's OCS server can process the exchange between MSN and SIP. However, this method only works in a business environment, and not all VoIP protocols are open to the exchange. For example, Skype is not open to the exchange of protocols.

For the foregoing reasons, there is a need to offer a system or method to solve the stated problem.

SUMMARY

An objective of the present invention is to provide a system that allows a user to use the VoIP phone as a controlling interface to make or receive internet phone calls transmitted via PC-based softphones such as MSN Messenger, YAHOO Messenger, or Skype.

To achieve the foregoing objectives, and in accordance with the purpose of the present invention as broadly described herein, the present invention provides an internet phone integrating system. The system includes a PC, a VoIP phone, a softphone, an HID signal-transmitting unit, and a media transmitting unit. The VoIP phone provides an HID inputting signal. The softphone provides an HID outputting signal and a media controlling signal and decodes an audio coding streaming to a media data flow. The HID signal-transmitting unit receives the HID outputting signal from the softphone and sends the HID outputting signal to the VoIP phone, and receives the HID inputting signal from the VoIP phone and sends the HID inputting signal to the softphone. The media transmitting unit receives the media controlling signal and media data flow from the softphone and sends the media controlling signal and media data flow to the VoIP phone, and receives the media data flow from the VoIP phone and sends the media data flow to the softphone.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
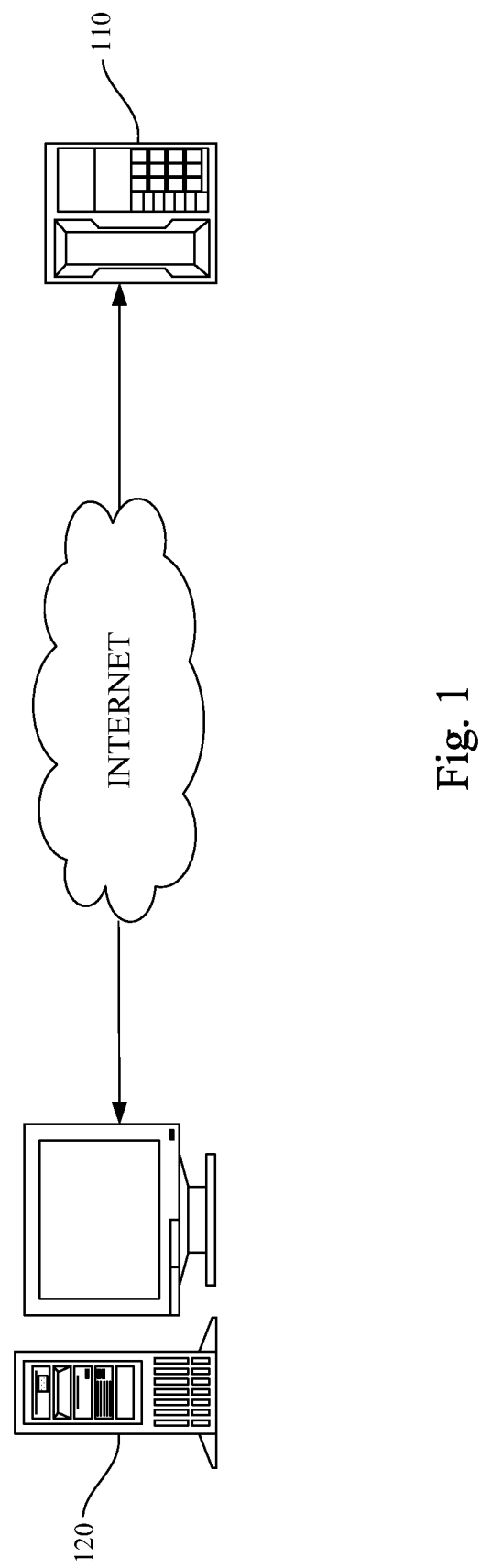
FIG. 1 is a diagram showing possible hardware connections according to one preferred embodiment of this invention.

Reference will now be made in detail to the present preferred embodiments of the invention, examples of which are illustrated in the accompanying drawings. Wherever possible, the same reference numbers are Please refer to FIG. 1. FIG. 1 is a diagram showing possible hardware connections according to one preferred embodiment of this invention. A VoIP phone 110 and a user PC 120 are both connected to the Internet. The VoIP phone 110 supports at least one internet protocol such as SIP (Session Initiation Protocol) and H.323. After the VoIP phone 110 creates connection with the user PC 120 via the Internet, a user can use the VoIP phone 110 as a controlling interface to call or receive internet phone calls transmitted via softphones such as MSN Messenger, YAHOO Messenger, or Skype. The VoIP phone 110 can still be used to call or receive Internet phone calls via the internet protocol it supports.

Figure 2:
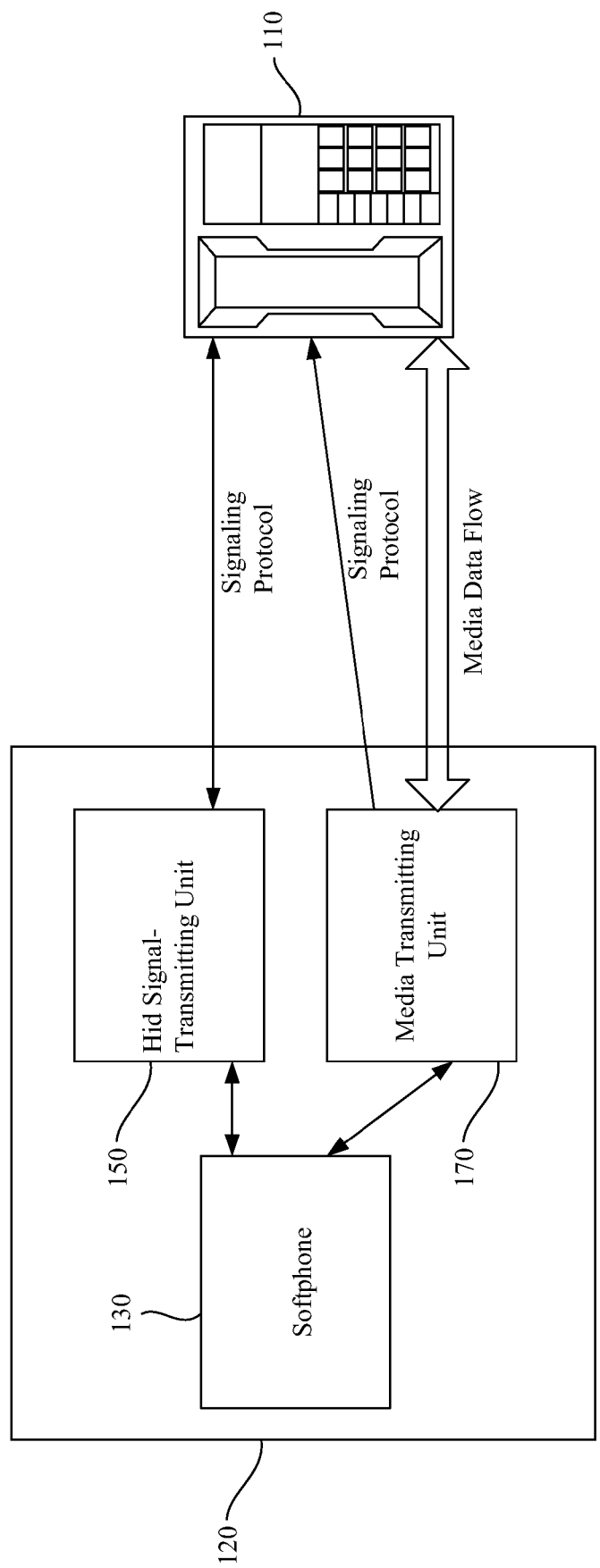
FIG. 2 is a system diagram according to one preferred embodiment of this invention.

Please refer to FIG. 2. FIG. 2 is a system diagram according to one preferred embodiment of this invention. The internet phone integrating system includes a VoIP phone 110, a user PC 120, a softphone 130, an HID (Human Interface Devices) signal-transmitting unit 150, and a media transmitting unit 170.

The softphone 130 decodes the protocol it supports and provides an HID outputting signal and a media controlling signal, and decodes an audio coding streaming to a media data flow. The HID signal-transmitting unit 150 is installed on the user PC 120. The HID signal-transmitting unit 150 receives the HID outputting signal from the softphone 130 and sends the HID outputting signal to the VoIP phone 110, and receives the HID inputting signal from the VoIP phone 110 and sends HID inputting signal to the softphone 130. The media transmitting unit 170 is installed on the user PC 120. The media transmitting unit 170 receives the media controlling signal and media data flow from the softphone 130 and sends the media controlling signal and media data flow to the VoIP phone 110, and receives the media data flow from the VoIP phone 110 and sends the media data flow to the softphone.

The softphone 130 communicates with the VoIP phone 110 by sending requests to the HID signal-transmitting unit 150 and the media transmitting unit 170, and then the HID signal-transmitting unit 150 and the media transmitting unit 170 use a signaling protocol to send request message packets to the VoIP phone 110.

Based on the HID outputting signal received from the softphone 130, the HID signal-transmitting unit 150 responds accordingly. The softphone 130 accesses the HID signal-transmitting unit 150 with the following functions: open( ), read( ), write( ), close( ) and ioctl( ). The softphone 130 use open( ) to obtain the access to and description of the HID signal-transmitting unit 150. The HID signal-transmitting unit 150 will try to establish a connection with the VoIP phone 110, and reports whether the connection is successful back to the softphone 130.

The softphone 130 uses read( ) to obtain commands entered by the user from the VoIP phone 110. The VoIP phone 110 sends out a corresponding request message packet to the HID signal-transmitting unit 150 after receiving a command signal such as the user's pressing of keys. For example, the VoIP phone 110 sends out a DGT0 key down request message packet or an off hook request message packet to the HID signal-transmitting unit 150. Then, the HID signal-transmitting unit 150 uses "Interrupt" to inform the softphone 130 to receive data and transform request message packets to corresponding USB HID data.

The softphone 130 uses write( ) to enter HID control commands to the HID signal-transmitting unit 150. For example, HID control commands could be LED On and LED Off, and displaying texts on LCD. The HID signal-transmitting unit 150 sends out a request message packet to the VoIP phone 110 accordingly. For example, The HID signal-transmitting unit 150 sends out a "Hold LED on" request message packet or a "LCD write text" request message packet, and the VoIP phone 110 would change its appearance based on the message.

The softphone 130 uses close( ) to release the access right to the HID signal-transmitting unit 150. The HID signal-transmitting unit 150 responds the close( ) action by tearing down the connection with the VoIP phone 110 and reporting whether the teardown is successful back to the softphone 130.

The softphone 130 uses ioctl( ) to do extra settings to the HID signal-transmitting unit 150. The HID signal-transmitting unit 150 might ignore the request or send out request message packets to the VoIP phone 110 based on the settings.

The softphone 130 also accesses the media transmitting unit 170 with the following functions: open( ), read( ), write( ), close( ) and ioctl( ). The softphone 130 use open( ) to obtain the access to and description of the media transmitting unit 170 before playing media data. The media transmitting unit 170 will in turn send out an "open RTP channel" request message packet to the VoIP phone 110.

The softphone 130 uses read( ) to obtain media data from the media transmitting unit 170. The VoIP phone 110 compresses media data, puts the compressed media data into RTP media data packets (or puts the uncompressed media data into RTP media data packets directly) and sends the RTP media data packets to the media transmitting unit 170 after receiving a media signal such as voice or video recording. The VoIP phone 110 sends out one or more RTP media data packets to the media transmitting unit 170 based on the size of media data. The softphone 130 then performs the read( ) action to obtain media data from the media transmitting unit 170, and the media transmitting unit 170 in turn decompresses the media data in the RTP media data packets and sends to the softphone 130.

The softphone 130 uses write( ) to write the uncompressed or decompressed media data into the media transmitting unit 170. The media transmitting unit 170 puts media data into one or more RTP media data packets and sends to the softphone 130. The media data in RTP media data packets might be compressed or uncompressed.

The softphone 130 uses close( ) to release the access right to the media transmitting unit 170. The media transmitting unit 170 responds the close ( ) action by sending a "close RTP channel" request message packet to the VoIP phone 110.

The softphone 130 uses ioctl( ) to do extra settings to the media transmitting unit 170. The media transmitting unit 170 might ignore the request or send out request message packets to the VoIP phone 110 based on the settings.

Figure 3:
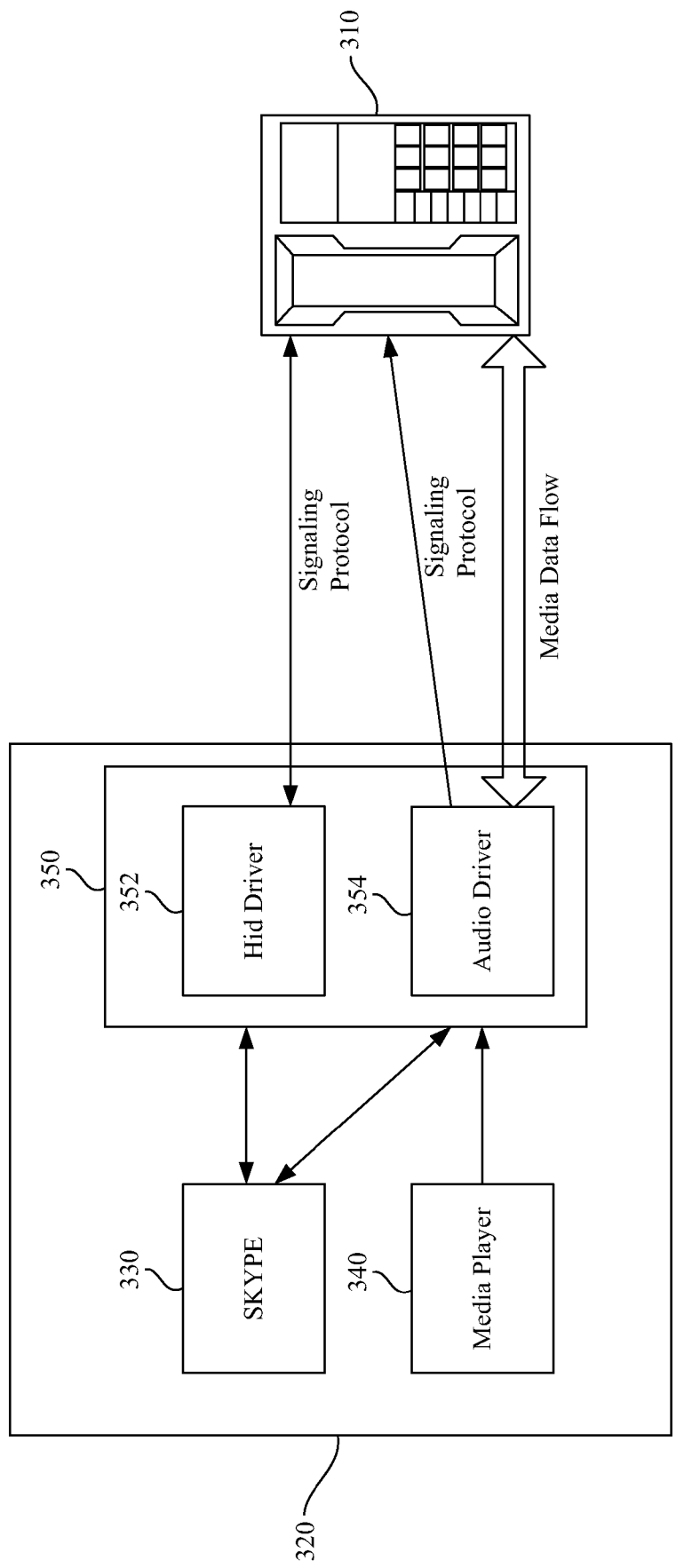
FIG. 3 is a system diagram according to another preferred embodiment of this invention.

Please refer to FIG. 3. FIG. 3 is a system diagram according to another preferred embodiment of this invention. The internet phone integrating system includes a VoIP phone 310, a user PC 320, Skype 330 (a softphone), Media Player 340, and a driver 350. The driver 350 includes HID driver 352 and audio driver 354.

Users install the driver 350 on the user PC 320 and connect the user PC 320 and the VoIP phone 310 to the Internet. The driver 350, similar to a USB phone, includes an HID driver 352 and audio driver 354. When a user uses the VoIP phone 310 as a controlling interface to make an internet phone call via Skype 330, the VoIP phone 310 uses a signaling protocol to send a request message packet to HID driver 352. HID driver 352 in turn sends the user' event data (having the same effect of user's pressing of keys on the USB phone) to Skype 330. Skype 330 asks audio driver 354 to play voice data, so audio driver 354 will ask the VoIP phone 310 to open RTP data flow. RTP data flow might be RTP data flow of Pulse-code modulation (PCM), RTP data flow of G.711, or RTP data flow with other encoding methods.

Audio driver 354 then sends RTP data flow to the VoIP phone 310, and the VoIP phone 310 will play the audio signal with a speaker. At this moment, the connection for sending signals between the VoIP phone 310 and Skype 330 is already created. The VoIP phone 310 uses a microphone to receive the user's audio signals and sends to audio driver 354 with RTP data flow. Then, Skype 330 obtains the user's audio signals from audio driver 354. This completes the signal transmission process between the caller and the receiver.

When the user uses the VoIP phone 310 as the controlling interface to receive an internet phone call via Skype 330. HID driver 352 responds the request from Skype 330 and informs the VoIP phone 310 an incoming call. When the user picks up the call, audio driver 354 asks the VoIP phone 310 to open RTP data flow. Then, audio driver 354 sends the audio signal from Skype 330 with RTP data flow to the VoIP phone 310. Similarly, Media Player 340 can use audio driver 354 to open RTP data flow and uses the speaker on the VoIP phone to play music files on the user PC.

When the VoIP phone 310 receives the request to open RTP data flow, the VoIP phone 310 takes this event as an event supported by its protocols. As a result, the VoIP phone 310 can use keys like "flash" and "line" to switch between internet phone calls from different sources, such as SIP or Skype.

In conclusion, the user can use the VoIP phone as a controlling interface to make or receive internet phone calls transmitted via PC-based softphones such as MSN Messenger, YAHOO Messenger, or Skype, instead of using a USB phone connected directly with a PC. The VoIP phone can still be used to call or receive Internet phone calls with the VoIP protocol it supports.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An internet phone integrating system, using a VoIP phone as a user's controlling interface to call or receive internet phones transmitted via softphones, the system comprising:
  a user PC (personal computer) connected to the Internet;
  a VoIP phone providing a Human Interface Devices (HID) inputting signal;
  a softphone, installed on the user PC, the softphone providing an HID outputting signal and a media controlling signal, and decoding an audio coding streaming to a media data flow;
  an HID signal-transmitting unit, installed on the user PC, the HID signal-transmitting unit receiving the HID outputting signal from the softphone and sending the HID outputting signal to the VoIP phone, and receiving the HID inputting signal from the VoIP phone and sending the HID inputting signal to the softphone, such that the VoIP phone is controlled to call or receive the internet phones via the softphone, wherein the HID signal-transmitting unit creates connection with the VoIP phone through the Internet; and
  a media transmitting unit, installed on the user PC, the media transmitting unit receiving the media controlling signal and media data flow from the softphone and sending the media controlling signal and media data flow to the VoIP phone, and receiving the media data flow from the VoIP phone and sending the media data flow to the softphone.

2. The system of claim 1, wherein the softphone communicates with the VoIP phone by sending access requests to the HID signal-transmitting unit and the media transmitting unit, and the HID signal-transmitting unit and the media transmitting unit use a signaling protocol to send request message packets to the VoIP phone.

3. The system of claim 2, wherein the media transmitting unit creates connection with the VoIP phone through the Internet.

4. The system of claim 1, wherein the media data flow is transmitted by using Real-time Transport Protocol (RTP).

5. The system of claim 1, wherein the media data flow is transmitted by using pulse-code modulation (PCM).

6. The system of claim 1, wherein the media data flow is transmitted by using G.711.

7. The system of claim 1, wherein the HID signal-transmitting unit is implemented with a driver on the user PC.

8. The system of claim 1, wherein the media transmitting unit is implemented with a driver on the user PC.

9. The system of claim 1, wherein the softphone is MSN Messenger, YAHOO Messenger, or Skype.

10. An internet phone integrating method, using a VoIP phone as a user's controlling interface to call or receive internet phones transmitted via softphones, the softphones being installed on a user PC, the VoIP phone being connected to the softphones through the Internet, the method comprising:
  a VoIP phone sending a Human Interface Devices (HID) inputting signal to an HID signal-transmitting unit, the HID signal-transmitting unit being installed on the user PC;
  a softphone sending an HID outputting signal to the HID signal-transmitting unit and decoding an audio coding streaming to a media data flow, the softphone being installed on the user PC;
  the HID signal-transmitting unit receiving the HID outputting signal from the softphone and sending the HID outputting signal to the VoIP phone, and receiving the HID inputting signal from the VoIP phone and sending HID inputting signal to the softphone, such that the VoIP phone is controlled to call or receive the internet phones via the softphone, wherein the HID signal-transmitting unit creates connection with the VoIP phone through the Internet;
  the softphone sending a media controlling signal to a media transmitting unit, the media transmitting unit being installed on the user PC;
  the media transmitting unit receiving the media controlling signal and creating a data flow connection with the VoIP phone; and
  the media transmitting unit receiving the media controlling signal and media data flow from the softphone and sending to the VoIP phone, and receiving the media data flow from the VoIP phone and sending the media data flow to the softphone.

11. The method of claim 10, wherein the softphone communicates with the VoIP phone by sending access requests to the HID signal-transmitting unit and the media transmitting unit, and the HID signal-transmitting unit and the media transmitting unit use a signaling protocol to send request message packets to the VoIP phone.

12. The method of claim 11, wherein the media transmitting unit creates connection with the VoIP phone through the Internet.

13. The method of claim 10, wherein the media data flow is transmitted by using Real-time Transport Protocol (RTP).

14. The method of claim 10, wherein the media data flow is transmitted by using pulse-code modulation (PCM).

15. The method of claim 10, wherein the media data flow is transmitted by using G.711.

16. The method of claim 10, wherein the HID signal-transmitting unit is implemented with a driver on the user PC.

17. The method of claim 10, wherein the media transmitting unit is implemented with a driver on the user PC.

18. The method of claim 10, wherein the softphone is MSN Messenger, YAHOO Messenger, or Skype.

* * * * *